March 26, 1940.  E. B. CRAWFORD ET AL  2,195,326
TRAY STABILIZING DEVICE
Filed Sept. 18, 1937
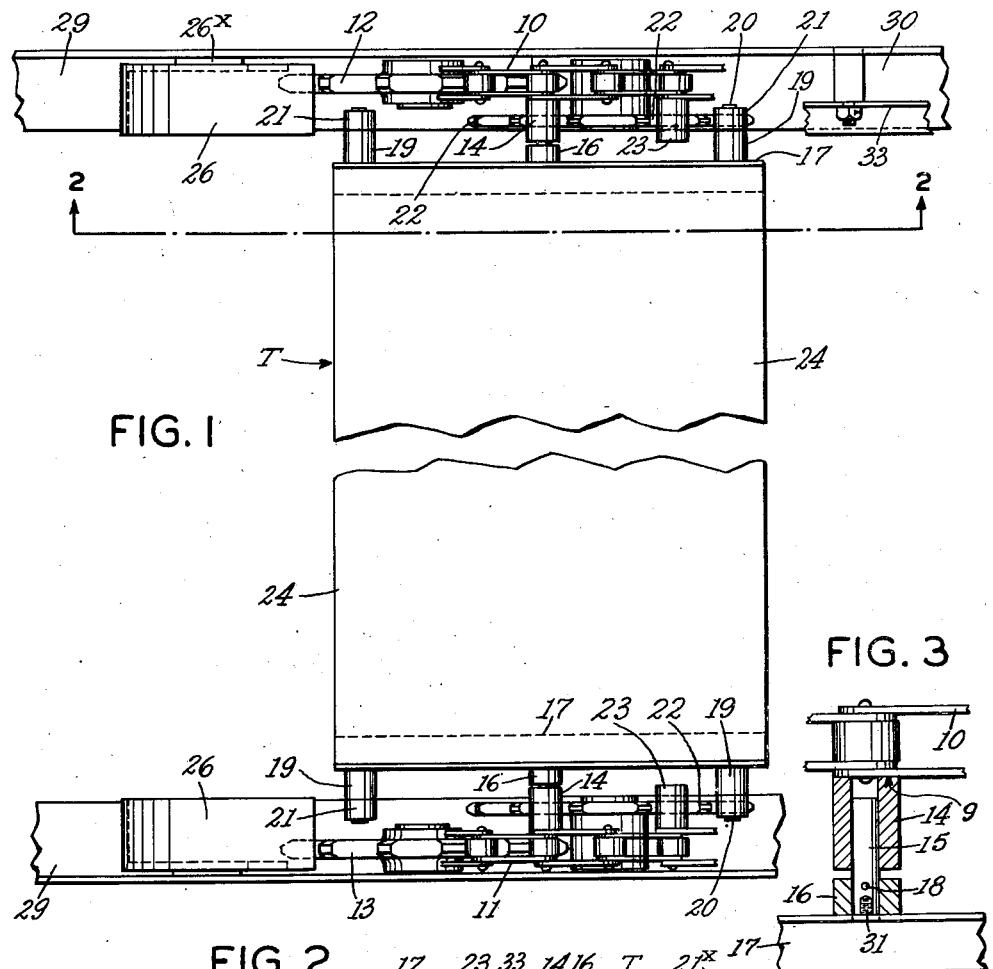
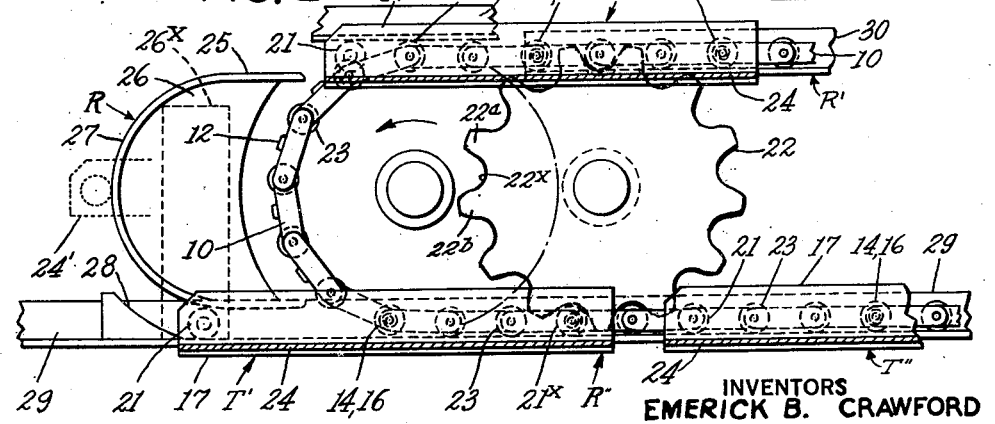
INVENTORS
EMERICK B. CRAWFORD
BY MERTON R. TURRELL
ATTORNEY

Patented Mar. 26, 1940

2,195,326

UNITED STATES PATENT OFFICE

2,195,326

TRAY STABILIZING DEVICE

Emerick B. Crawford, Hamden, and Merton R. Turrell, Bethany, Conn., assignors to American Machine & Foundry Company, a corporation of New Jersey Application September 18, 1937, Serial No. 164,484

3 Claims. (Cl. 198—133)

This invention relates to a conveyor, especially to an endless conveyor having runs in different planes spaced apart vertically, and more particularly relates to a conveyor provided with trays all of which are designed to occupy a horizontal position throughout their travel, in order that they may not disarrange the articles upon the trays when passing through the arcuate transfer runs from the lower straight runs to the upper straight runs, and from upper runs to lower runs.

The provision of stabilized trays is of notable importance for conveyors used in ovens, and there is a well-known and unsatisfied need for the provision of stabilized trays for heavy-duty, general-purpose ovens. The use of stabilized trays in ovens, hitherto, has, for the most part, been limited to the biscuit and confectionery industries, where very light loads have been handled on trays of relatively light construction. Such equipment, thus designed for handling light materials, involves a structure which is either too light or too fragile for heavy-duty, general-purpose ovens, and it would involve undue complications if its use for heavy duty were attempted without extensive structural adaptations and changes.

The patent to Greer, No. 1,321,520, issued on November 11, 1919, discloses a conveyor of the type above noted as conventional; and its structure would require an inordinate amount of change to provide for its adaptation to heavy-duty general-service ovens; and the present invention is of the nature of an improvement upon this and other conveyors of the same general type.

Under such conditions, an object of the present invention is to make available a means for stabilizing in the simplest possible manner large trays such as those used in ovens, in which there is at present no satisfactory means, broadly considered, for stabilizing the heavy-duty trays herein illustrated, and this lack of a tray-stabilizer differentiates the baking oven tray conveyors of a conventional type from those herein disclosed.

Another object of the invention is to provide a construction which will be rugged, and free from such maintenance difficulties as result from the use of timing gears which have been proposed for employment as stabilizers, but are open to the objection that in use the gears are subjected to the action of oven-heats which reach a temperature of some 450 degrees F., by which the gears are affected unfavorably. A further object of the present invention is to provide an improved form of sprocket wheels and tray-supporting chains, serving to effect direct stabilization of the trays, without the use of gears, and also eliminating the existing need of means for synchronizing the stabilizing sprocket with the driving sprocket, other than the action of the conveyor itself.

As a further feature of the invention, provision is made of means to prevent lost-motion or "shake" of the trays, and undue movement thereof when making the transfers from level to level, characteristic of this type of oven. Such provision in pursuance of the present invention, is made in part by the use of sufficient locking points on the stabilizing sprockets to conform with any number of teeth which would be used in a practical installation; and includes the further provision of a drive chain having projecting hubs or bosses welded or otherwise secured in fixed position upon the chain at certain points; preferably at or near every fourth chain pin, and each adapted to serve as a central support at each end of a conveyor tray, thus permitting easy removal of the tray at any point in the conveyor, without the need for spreading the chain apart, or for making other provisions of an unusual character.

In accordance with the above general objects, a more particular object is to effect the provision, in a conveyor mechanism of the class described, of the combination with an endless chain conveyor device operating in a series of connected straight and arcuate runs disposed in an upright plane, said chain having a series of carriers or trays at spaced regions along its length, of rotary means to stabilize said trays in parallelism with the horizontal, throughout said straight and arcuate runs, and means, carried by said chain, engaging and driving said rotary means.

As a further object of the invention, provision is made for the coincidence of the point at which each tray is supported with each projecting hub or boss used in connection with the stabilizing device therefor, whereby it is possible to eliminate the need for extension of the chain-link-pins themselves to carry the trays, and thereby is realized a stronger and much more accessible structure than those of the prior art.

Other objects and features of the invention will appear as the description of the particular physical embodiment selected to illustrate the invention progresses.

In the accompanying drawing, like characters of reference have been applied to corresponding parts throughout the several views which make up the drawing, in which:

Fig. 1 is a plan view of a tray-stabilizing mechanism in the construction of which the present invention has been embodied;

Fig. 2 is a view in vertical, sectional elevation, taken on the line 2—2 of Fig. 1; and Fig. 3 is a fragmentary, detail view on an enlarged scale illustrating the mode of fastening the trays and endless conveyor chains, in carrying into effect this feature of the invention.

Referring to the drawing, the now-preferred embodiment of the invention as therein disclosed comprises mechanism including a pair of endless conveyor chains 10 and 11, adapted to be disposed at opposite sides of an oven (not shown) which may be of a suitable type, such as commercial ovens known to persons skilled in the art, the chains running over sprocket wheels 12 and 13 respectively, at each arcuate transfer run, such as that designated generally by the reference character R (see Fig. 2), from one of the straight runs, as R' to another straight run, as R". As in the above-mentioned patents, there may be an upper run, a lower run, and as many intermediate straight runs, and connecting arcuate runs, as may be required for the intended use, the chains being endless, and of appropriate length.

In pursuance of the invention, the chains are provided, at properly spaced intervals, with hubs or bosses 14, which may be secured thereto in any suitable manner, as by welding, which avoids the necessity for making a special chain with extended link pivots, although it is not intended to exclude the use of hubs formed in any convenient manner.

These hubs are adapted to support pivotally studs, as 15, connecting with similar bosses 16 extending from the rectangular tray frames 17, said studs being securely fastened to the bosses 16 by anchor pins 18. The frames 17, at their ends, have bosses 19, spaced laterally at equal distances from the carrier hubs 16; and supporting studs 20 are provided, on which are mounted anti-friction rollers 21 adapted to engage the sprocket wheels 22, which are adapted to serve as stabilizer sprockets and are hereinafter so designated.

Upon every fourth link, and spaced from the hubs 14 of the chains, are provided bosses 23 which project from the chains into the plane of the stabilizer sprockets 22 thereby engaging and driving said sprockets.

It will be understood, from the foregoing description, that not only do the hubs 14 and bosses 23 drive the stabilizer sprockets, but also that the rollers 21 on the tray frame ends assist in driving the same.

Arcuate guide shoes or tracks 26 are provided, upon supporting shoes suitably braced by the members 26x, and the guides comprise horizontal portions 25 parallel with the straight runs 29 and 30 of the conveyor and substantially tangent to the base circle of the gear of the stabilizing sprockets 22, and said guide comprise also arcuate portions 27, substantially as shown in Fig. 2.

In the operation of the conveyor, as the trays T, each of which consists of the end frames 17 and the cross-plate 24, ride over the sprockets 12 and 13, the forward tray rollers 21 run upon the horizontal portion 25 of the guides 26. The continued advancement of the tray results in the forward rollers 21 riding over the circular surfaces 27 of the guides 26, and since the rear tray rollers 21x continue their position between the teeth of the particular flutes, as 22x, of the stabilizer sprocket wheels, in which said rear tray rollers may be engaged, while the forward tray rollers 21 descend, around the guides 27, it will be clear that the rear rollers 21x will be at all times so disposed, between the tooth surfaces 22a and 22b, for example, that there can be no substantial departure of the trays from their desired horizontal positions, and thus a complete and satisfactory condition of stabilization is assured, for each tray, and consequently for its contents, whatever be their size and/or weight.

As a tray T approaches the lower position (see T', Fig. 2), its front roller 21 enters an arcuate guide path formed between the wall 27 and a curved guide or abutment 28 provided above the rail 29, and the said front roll 21 is guided on to the rail, which serves also to guide the roll 21x, the latter now constituting the leading roll, and by such associated action of the rolls 21 and 21x upon the rail 29, the tray 24 is caused to maintain its horizontal position until the end of the lower horizontal run, from which the tray will enter upon an upward transfer movement, directed therein by a curved block (not shown), such as that illustrated at 28, and a curved guide (not shown) such as that illustrated at 27.

It will be understood readily that there can be provided as many of such associated guides, and stabilizer sprockets, co-acting to keep the trays horizontal, as there may be transfers of the chains 10 and 11 from level to level, either through an upward series of transfers or a downward series thereof, and that suitable rails, as 30, will be provided to align the tray carrier rolls along each of the overhead runs.

The studs 15 are provided with tapped recesses 31 (see Fig. 3), providing means to receive a correspondingly threaded plug or tool to facilitate removal of the studs 15 when it is desired to remove, and replace one of the trays.

The mechanism above disclosed is entirely free from meshed gears exposed to destructive heating, and all engaged parts co-act to maintain the trays in stabilized horizontal disposition, while passing through the curved and straight runs, respectively. The above-described parts are fitted together with such a tolerance that ample clearance is provided for heat-induced variations in their dimensions and accordingly such variations will be accommodated without impairment of the stability of each tray at any given portion of its run.

The structure as a whole is sturdy, open for inspection and repair at all its parts, and has relatively few parts to maintain in order.

It is of an inexpensive construction, easy to erect, and does not require, in operation, an amount of mechanical skill greater than that to be expected from an operative in a bakery, or in any installation for which our improved conveyor is adapted, as its use is not limited to employment in an oven, such utilization being merely illustrative.

Any of the hubs secured to the chain links may be used as the pivotal support for the trays. In other words, since most of the load of the tray will be on the pivot, it is possible that the particular chain roller and bushing at that pivot point will wear faster than the other chain rollers and bushings. It is, however, possible to obtain additional wear from the chain by shifting all of the trays back a matter of two chain pitches.

Provision is made, also, of a guide member 33 which overlies the path of the rollers 21, 23, 21x, etc., and prevents tilting of the tray, acting as a restraining member primarily against the rear tray roller 21x. In other words, as the tray is passing toward the tray guide shoe 25 on the upper track, if the load be disposed toward the forwarding moving edge, that edge of the tray will tilt downward and foul the end of the shoe 25, in the absence of this upper guide 33.

What is claimed is:

1. In a conveyor mechanism of the class described: the combination with an endless chain conveyor device operating in a series of connected straight and arcuate runs disposed in an upright plane, said chain having a series of carriers or trays at spaced regions along its length; or rotary means to stabilize said trays in parallelism with the horizontal, throughout said arcuate runs; means on said trays for engagement with said rotary stabilizer, thereby to rotate said stabilizer and also to stabilize said trays; and means attached to the moving conveyor, constructed and arranged to rotate said stabilizer, in addition to, and in timed relation with, said means on the trays, and serving to lock together the rotary stabilizers at the spaced ends of each run, in fixed angular relation to each other.

2. In a conveyor mechanism of the class described: the combination with an endless chain conveyor device operating in a series of connected straight and arcuate runs disposed in an upright plane, said chain having a series of carriers or trays at spaced regions along its length, journalled on projections extending from said conveyor to the midpoint of each end of each tray, and said trays having lateral projections in pairs at each end of each tray; of rotary means to stabilize said trays in parallelism with the horizontal, throughout said arcuate runs, and additional projections extending from said conveyor, at points intermediate the projections by which said trays are mounted pivotally upon the conveyor; said pivot projections being constructed and arranged to engage and drive said rotary stabilizers, and said additional projections being constructed and arranged for direct driving engagement exclusively with said rotary stabilizers, at points intermediate the points at which the rotary stabilizers are engaged by said pivot projections, so that all of said projections cooperate for driving said rotary stabilizer means continuously when in motion, and also cooperate for locking together the rotary stabilizers at the spaced ends of each run in timed relation, and in fixed angular relation to each other; and guides each having a portion in parallelism with the tooth base circle of such rotary stabilizer means, and in parallelism with the curved path followed by said conveyor around an arcuate run, to be engaged with a pair of spaced lateral projections near the leading end of each tray, substantially as described.

3. A conveyor apparatus of the class having an endless conveyor comprising a pair of sprocket chains, sprocket wheels for guiding said chains in upper and lower runs, and a series of carriers connected pivotally between said chains, said apparatus being characterized by stabilizing means to maintain said carriers substantially horizontal when transferring from one run to another, including a curved guide outside of the orbit of said sprocket chains and adapted to direct in a curved path a portion of said carrier projecting beyond said path, and an auxiliary stabilizing sprocket wheel within said path and adapted to guide in a similar curved path a portion of said carrier extending within said path, said trays having lateral projections constituting complemental stabilizing connections with said stabilizing sprocket wheels, and said stabilizers being wholly free from geared connections and from other connections than those mounted on the tray conveyors and trays.

EMERICK B. CRAWFORD.
MERTON R. TURRELL.